United States Patent
Shaw

[11] Patent Number: 5,953,043
[45] Date of Patent: Sep. 14, 1999

[54] SIGNAL TRANSMISSION SYSTEM

[76] Inventor: Lew Shaw, P.O. Box 19027, Johnston, R.I. 02919-0027

[21] Appl. No.: 08/689,522

[22] Filed: Aug. 9, 1996

[51] Int. Cl.[6] .................................................... H04N 7/16
[52] U.S. Cl. ................................ 348/6; 348/723; 455/3.1
[58] Field of Search ................................ 348/6, 12, 13, 348/7, 723, 724, 725, 726, 143, 8; 455/3.1, 3.2, 4.1, 4.2, 5.1, 6.1, 6.2, 6.3

[56] References Cited

U.S. PATENT DOCUMENTS

| | | |
|---|---|---|
| 2,201,554 | 5/1940 | Clothier et al. ........................ 348/723 |
| 3,590,276 | 6/1971 | Watson . |
| 3,652,933 | 3/1972 | Rubner et al. . |
| 3,725,781 | 4/1973 | Cox . |
| 3,895,321 | 7/1975 | Seidel . |
| 3,909,750 | 9/1975 | Brady . |
| 3,971,999 | 7/1976 | Bilsens et al. . |
| 4,268,858 | 5/1981 | Wood ........................................... 348/8 |
| 4,403,255 | 9/1983 | Schiff ....................................... 348/724 |
| 4,612,653 | 9/1986 | Livingston et al. . |
| 4,907,087 | 3/1990 | Schreiber ................................ 348/724 |
| 5,038,115 | 8/1991 | Myers et al. . |
| 5,387,927 | 2/1995 | Look et al. ............................... 455/3.1 |
| 5,430,498 | 7/1995 | Ta et al. ................................... 348/723 |
| 5,539,449 | 7/1996 | Blahut et al. .............................. 348/7 |
| 5,546,193 | 8/1996 | Hailey et al. ........................... 348/725 |
| 5,555,016 | 9/1996 | Rhodes et al. .............................. 348/6 |

Primary Examiner—Chris Grant
Attorney, Agent, or Firm—Samuels, Gauthier & Stevens

[57] ABSTRACT

An electrical signal transmission system is disclosed and includes a transmission unit and a receiver unit. The transmission unit converts the relative amplitudes of an input amplitude signal to a time domain representative signal of varying pulse widths, and the receiver unit receives the time domain representative signal and generates an output signal representative of the input amplitude signal.

2 Claims, 2 Drawing Sheets

SIGNAL TRANSMISSION SYSTEM

BACKGROUND OF THE INVENTION

The invention relates to signal transmission systems, and is well suited for transmitting raster information signals from a television camera to a receiving station located a significant distance from the transmitter.

A TV camera outputs a signal that is a voltage vs. time waveform of the voltage levels, i.e., amplitudes of its scanned raster of periodic horizontal lines and includes synchronizing voltage pulses for the end of each horizontal line, for the end of each frame, and for in-phase or in-step generation of color by the TV set receiver. The camera's oscillator for color generates a color burst or brief cycles of 8 or 9 voltage pulses that are output by the camera as a component of the camera's output waveform that synchronizes the receiver oscillator with the camera's oscillator and are not frequency in themselves.

The output of the TV camera (NTSC) is a continuous voltage vs. time waveform of 525 horizontal lines by 30 frames per second. It is the sequential output of 15,750 horizontal line periods of 63.4 $\mu$sec. each that make up the total TV picture each second. The waveform is the voltage information that permits the receiver to restore the camera's original scanned pictures, in color, by use of the receiver's own hardware that is synchronized with the camera by the transmitted TV camera's waveform of voltage information.

The color subcarrier is not output by the TV camera, nor is the TV camera output a modulated waveform. The camera's subcarrier generates a color burst of voltage pulses that are included in its waveform so as to be the color reference for the receiver's production of color from its own oscillator.

Generally, the complete waveform output from the TV camera is a voltage vs. time waveform of the voltage levels of the brightness of the scanned horizontal lines of the raster and the added horizontal, vertical and color sync voltage pulses that are the information required by the TV receiver to regenerate the TV camera's pictures which are formed from the images on a TV sensor, e.g., tube or pixels. When output from the camera, the waveform is not an amplitude modulated (AM) signal, nor is it a sampled signal.

It is significant that the color sync pulses (or color bursts) are voltage signals that are phase references for the 3.58 MHz oscillator in the color processing circuitry of the receiver. The color bursts are not output from the TV camera as a signal that has a 3.58 MHz frequency.

The horizontal lines of the TV camera's raster are periodic, and each line has a period of 63.4 $\mu$sec (NTSC). The lines are the continuous periodic dc carrier of the voltage level information of the output voltage vs. time waveform that is the information for regeneration at the receiver.

The output of a color TV camera, therefore, is a composite color video signal that is the voltage information of the video generated by the camera to which are added sync pulses and color burst phase reference pulses. The 3.58 MHz color burst signal is suppressed. It is not actually transmitted, and the TV camera output is not a 3.5 MHz signal. It is known that the subcarrier provides the color information which the receiver must use to adjust its own 3.5 MHz subcarrier. The subcarrier activates a burst gate or burst generator that outputs a short sample of the subcarrier (e.g., 8 or 9 cycles) in the form of voltage that is added to the blanking signal. At the receiver, the burst voltage functions as a reference to keep the receiver's own 3.58 MHz subcarrier at the exact same frequency and phase as that of the 3.58 MHz suppressed subcarrier. The TV camera output is a composite color video signal comprising voltage information of the continuous sequential periods of the 525 horizontal lines of the raster (NTSC), from top to bottom, that have a period of 63.5 $\mu$sec (color video).

SUMMARY OF THE INVENTION

In an embodiment of the invention, the system provides an electrical signal transmission system comprising a transmitter circuit and a receiver circuit. The transmitter circuit is for receiving a television camera output signal and for generating a transmission signal. The transmitter circuit includes an impedance matching resistor, an alternating current coupler, a resistor-capacitor network, and a threshold crossing detector. The transmission signal represents the transfer function of the television camera output signal. The receiver circuit is for receiving the transmission signal and for generating an output signal representative of the television camera output signal. The receiver circuit includes an impedance matching resistor, and an operational amplifier for generating an output signal that is substantially similar to the television camera output signal, and a radio frequency modulator to provide a carrier for its display in a standard television set.

BRIEF DESCRIPTION OF THE DRAWINGS

The following description of the invention may be better understood with reference to the accompanying drawings in which.

DETAILED DESCRIPTION OF THE ILLUSTRATED EMBODIMENTS

Generally, the one volt peak to peak output waveform of a television camera (NTSC) is input to a transmitter's integrator, an exponential RC network that is a linear phase shift delay that outputs an impulse response which is the time domain counterpart of the frequency response. An RC circuit may be used as an integrator which may be considered a linear system with an impulse response. When an impulse is applied at the input of any linear system, for example an op amp, the output is the transfer function.

The color subcarrier is not output nor is the output a modulated waveform. The camera's subcarrier generates a color burst of voltage pulses that are included in its output waveform so as to be the color references for the receiver's production of color from its own oscillator.

The transmitter op amp then converts the RC network's impulse response waveform's relative amplitudes into a varying pulse width waveform that represents time. The varying pulse width is symmetrical because a mid-level zero crossing threshold for the waveform has been generated by a voltage input to the op amp's non-inverting port that is one-half the voltage of the waveform input to the transmitter. The output amplitudes of the varying pulse width waveform are flat over all frequencies. Time is the pulse width, and the higher the amplitude the longer the time.

The transmitter output is a signal that has flat amplitude and linear phase shift delay characteristics over the range of frequencies covered by the input waveform. The output signal is therefore distortionless and the transmission is of the transfer function of the TV camera's output waveform. The technology transmitter output is thereby an ac current signal that would ride on the dc current loop of the standard telephone system precisely as the transmission of voice or sound.

The transfer function completely characterizes the output of the TV camera. Accordingly, when the transfer function waveshape is input to the technology receiver, the receiver's op amp responds precisely as it would respond to the original TV camera output waveform itself. This restores the original waveshape and outputs it to an RF modulator for output to a selected channel on a standard TV set (e.g., Ch. 3 or Ch. 4, NTSC), of any size screen, for display in instantaneous time and at 30 frames per second.

The transmission medium may be a standard telephone system (POTS). The transfer function waveform output from the technology transmitter would be input to the standard dial-up telephone system, world-wide, for transmission over existing telephone wiring through transformer coupling or by other means. Because the waveform is analog, modems would not be required. The waveform would also be transmittable over cable or by wireless or standard broadcast methods.

Figure 1A:
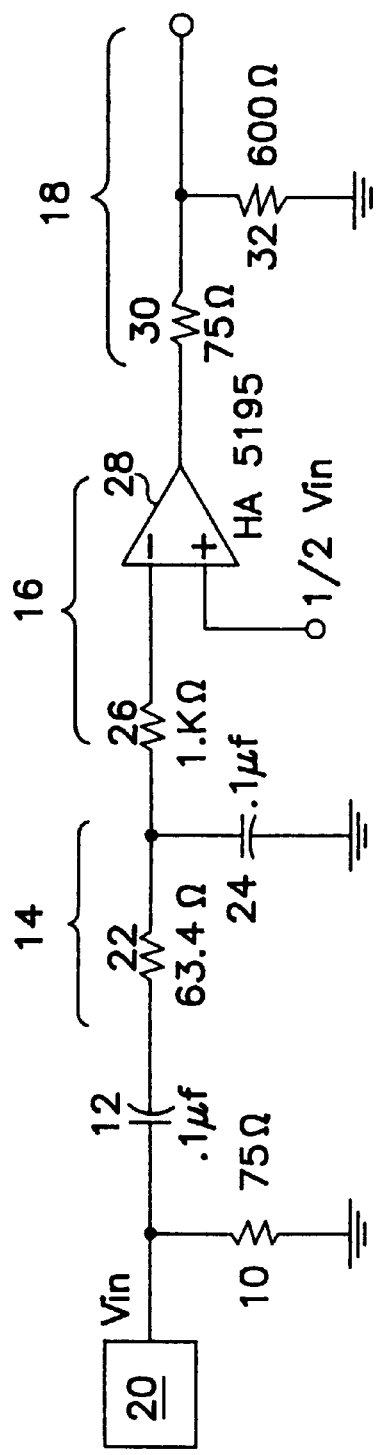
FIG. 1A is a diagram of a transmitter circuit of an embodiment of the invention.
Figure 1B:
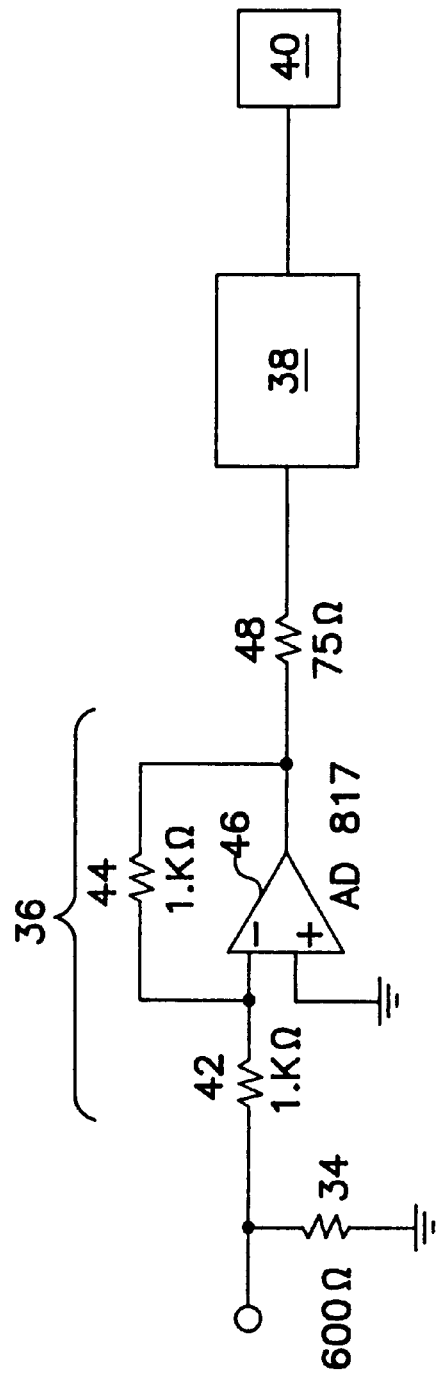
FIG. 1B is a diagram of a receiver circuit of the embodiment of the invention shown in FIG. 1A.

As shown in FIG. 1A a transmitter circuit of the invention includes an impedance matching resistor 10, an ac coupling capacitor 12, an RC network 14, and a zero crossing detector 16 for transmission via a communication channel or medium such as a standard telephone system.

The transmitter circuit receives as input the voltage waveform signal from a television camera 20. The signal contains the voltage vs. time raster information representative of the images from the camera 20. The ac coupling capacitor 12 acts as a voltage to current transducer and removes the dc characteristics of the input waveform.

The RC network includes a resistor 22 and a capacitor 24 and has a time constant of 64 $\mu$sec (or other values). The network acts as an exponential integrator. The impulse response output is the time domain counterpart of the frequency response. The output of the RC circuit therefore is the impulse response of the input video waveform.

The zero crossing detector includes an input resistor 26 and an operational amplifier 28. The reference voltage for the op amp 28 input to the non-inverting port is ½ the input waveform's voltage thereby creating the mid-level zero-crossing threshold. The zero-crossing detector converts relative amplitudes to time, as varying pulse widths. The higher the amplitude, the longer the pulse width.

The output stage 18 includes a telephone line impedance matching resistor 32, and video impedance matching resistor 30 as shown in FIG. 1A. The input of signals to the op amp in any of the embodiments can be reversed from inverting port to non-inverting port, or vice-versa, if desired, to achieve effects such as possible image reversal.

The transmitter output signal is sent through standard telephone communication channels or may be broadcast via standard radio or television frequency transmitters, or sent via cable etc.

A receiver circuit of the invention includes an inverting operational amplifier circuit 36, a radio frequency modulator 38, and a television set 40. The input stage 34 is an input resistor which provides impedance matching with, for example, a telephone line. The inverting op amp circuit 36 includes an input resistor 42, a feedback resistor 44 an op amp 46 and an output resistor 48. The op amp circuit 36 restores the original TV camera output waveform and amplifies it. The RF modulator 38 provides a carrier for the op amp circuit's output waveform to be displayed on the TV set's Ch. 3 or Ch. 4. Finally the TV set 40 displays video (NTSC, e.g., at 30 frames-per-second) in instantaneous time. The technology is equally applicable to a variety of types of input signals for transmitting any type of information signal.

A network transfer function is achieved by the zero crossing detector. The op amp converts the relative amplitudes of the input RC impulse response voltage into time measures as varying pulse width waveforms with time represented as pulse width.

The output of the transmitters op amp amplifier, which is in itself a system or a network, is the transfer function of the source of an input signal or a waveform. This output results from applying an impulse to the op amp amplifier that is the impulse response of the input signal or waveform, such as the output of a TV camera.

The RC circuit of the transmitter is a linear system with an impulse response. An impulse response is the time domain counterpart of the frequency response, or system frequency response, that completely characterizes the system. The impulse response and zero-crossing detector configuration provide the network transfer function. Thus, the transfer function (in the time domain or in the frequency domain) can be found by applying an impulse to a given system and measuring the resulting time response or the frequency response. Frequency and time approaches are related.

Since time and frequency are strongly inter-related and since the invention is in the time domain, the terms "impulse response" and "transfer function" can be construed as being interchangeable, the impulse response being the time domain counterpart of the frequency response.

The resulting time response is, in effect, the measurement of the RC circuits impulse response by the op amp amplifier which converts it to varying pulse width waveforms for transmission. If the network impulse response (e.g., the RC circuit of the technology) happens to be an impulse function itself, then the output is a delayed version of the input, since an RC circuit may act as a delay device.

In the technology's transmitter, the input of the RC circuit impulse response into an op amp amplifier is also the delayed TV camera waveform, or other input waveforms. In this way, it becomes clear that the op amp output is the measurement of its RC circuit impulse response, and therefore, the transfer function of the input signal or waveform.

The present invention generates the transfer function of the input signal or waveform, and rather then processing it as a mathematical equation, transmits it to receiver circuitry that restores the original waveform from the power or energy (voltage) of the transfer function, without error, loss or distortion, in instantaneous time.

Figure 2:
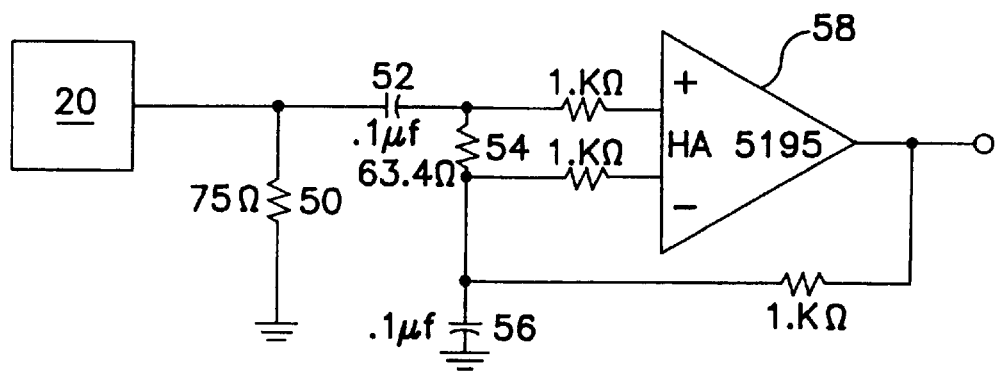
FIG. 2 is a diagram of a transmitter circuit of an alternative embodiment of the invention.

As shown in FIG. 2, an alternative embodiment of a transmitter network of the invention includes an impedance matching resistor 50, an ac coupling capacitor 52, an RC circuit comprising a resistor 54 and a capacitor 56 connected as shown to an operational amplifier 58. The op amp 58 forms part of a circuit including a one kilohm resistor in front of each of the two inputs, as well as a one kilohm feedback resistor as shown in FIG. 2.

During operation the output from the TV camera 20 is processed by the impedance matching resistor 50 and ac coupling capacitor 52 as described above, and then passed to the transmitter network that provides the impulse response network transfer function.

Figure 3:
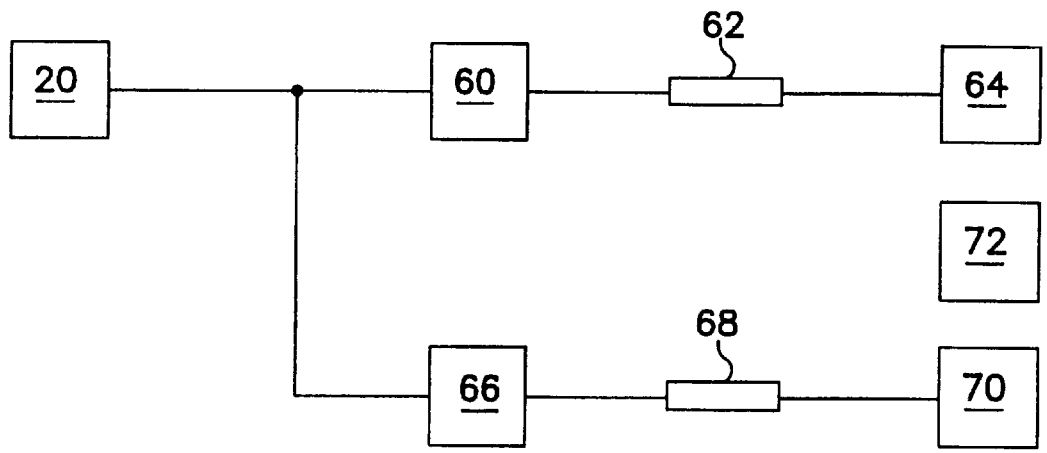
FIG. 3 is a block diagram comparing conventional transmission systems with a transmission system of the invention.

As shown in FIG. 3, a comparison of conventional transmission methods and the transmission method of the invention, shows that while conventional transmission provides RF modulation at the broadcast transmitter, the transfer function transmission system of the invention provides RF modulation in its receiver for input to existing TV sets. Specifically, the output of TV camera 20 is the voltage vs. time waveform, which is not AM modulated. Conventionally the composite video signal is then AM modulated at modulator 60 and then sent over conventional 6 MHz channel 62 prior to being received by a standard TV set 64. In accordance with the invention on the other hand, the output signal from the TV camera (which again is not AM modulated) is input to a transmitter 66 of the invention which translates the relative amplitudes into a time waveform of varying pulse widths for transmission through a standard telephone network 68. At the receiver 70 the original signal is recreated as discussed above and modulated by an RF modulator 72 which inputs the signal to a channel, e.g., 3 or 4, of the TV set 64.

In addition to transmitting video signals, the technology may also be employed for transmission of other waveforms such as but not limited to audio and computer data. For use with audio waveforms the system may include a microphone amplifier, a transmitter that provides the transfer function of the microphone amplifier output, and is transmitted through standard telephone lines, a receiver for recreating the original signal, and a speaker. In connection with the transmission of computer data the system may include a transmitter for providing the transfer function, the necessary computer signal, such as information stored in memory, transmission over standard telephone lines, and a receiver for recreating the original data signal and for outputting the signal via either computer screen, printer, storage or memory, etc.

The above disclosed embodiments of the invention are illustrative of some of the possible embodiments of the invention. Modifications and variations may be made to the above disclosed embodiments without departing from the spirit and scope of the invention.

What is claimed is:

1. An electrical signal transmission system comprising:
   a transmitter circuit for receiving a television camera output signal and for generating a transmission signal, said transmitter circuit including an impedance matching resistor, an alternating current coupler, a resistor-capacitor network, and a threshold crossing detector for producing said transmission signal wherein said transmission signal represents the transfer function of said television camera output signal; and
   a receiver circuit for receiving said transmission signal and for generating an output signal representative of said television camera output signal, said receiver circuit including an impedance matching resistor, and an operational amplifier for generating an output signal that is substantially similar to said television camera output signal, and a radio frequency modulator for input of said output signal to a television set.

2. An electrical signal transmission system comprising;
   a transmitter unit for receiving input signals to be transmitted and for television transmission signals to be sent to a receiver, said transmission unit including a circuit which includes a resistor and a capacitor for providing impulse response signals representative of said input signals, and a threshold crossing detector for producing said transmission signals wherein said transmission signals represent the transfer function of said input signals; and
   a receiver unit for receiving and outputting said transmission signals that are substantially identical to said input signals, wherein said receiver unit includes an operational amplifier for amplifying said transmission signals for input to suitable receivers, and wherein said television transmission signals are input to a radio frequency modulator for inputting said television transmission signals to a suitable television receiver for reproduction of television pictures.

\* \* \* \* \*